United States Patent [19]

Robillard

[11] Patent Number: 4,737,781

[45] Date of Patent: Apr. 12, 1988

[54] PROCESS FOR DISPLAYING INFORMATION

[75] Inventor: Jean J. A. Robillard, Limerick, Ireland

[73] Assignee: Fuji Photo Film Co., Ltd., Kanagawa, Japan

[21] Appl. No.: 833,699

[22] Filed: Feb. 27, 1986

[30] Foreign Application Priority Data

Mar. 4, 1985 [IE] Ireland ................................ 536/85

[51] Int. Cl.[4] .............................................. G09G 3/14
[52] U.S. Cl. ...................................... 340/763; 340/783; 350/353; 350/355; 365/119
[58] Field of Search ................ 340/763, 783; 350/266, 350/353, 355; 358/241; 365/119

[56] References Cited

U.S. PATENT DOCUMENTS

| | | | |
|---|---|---|---|
| 3,462,712 | 8/1969 | Boddy et al. | 350/355 |
| 3,656,836 | 4/1972 | de Cremoux et al. | 350/355 |
| 3,772,612 | 11/1973 | Gange | 350/355 |
| 4,091,375 | 5/1978 | Robillard | 340/763 |
| 4,199,229 | 4/1980 | Yamashita et al. | 350/353 |

OTHER PUBLICATIONS

English Translation of N. P. Bogoroditskii, V. Kristya and Y. A. I. Panova, Fiz. Tverd. Tela 9, 253, (1967).
A System of Large-Screen Television Reception Based on Certain Electron Phenomena in Crystals—A. H. Rosenthal—Proceedings of the IRE—May 1940, pp. 203–212.
AGARD-AGARD Conference Proceedings, No. 50, Opto-Electronics Signal Processing Techniques.

Primary Examiner—Gerald L. Brigance
Assistant Examiner—Jeffery A. Brier
Attorney, Agent, or Firm—Sughrue, Mion, Zinn, Macpeak and Seas

[57] ABSTRACT

Image formation is effected on the basis of the generation and erasing of color centers in a semiconducting oxide layer disposed between an electron injection layer and a hole injection layer. An image is formed by the trapping of electrons in color-center-promoting structural defects in the oxide layer when a potential difference is applied selectively across the oxide layer with the electron injection layer being negatively biased relative to the hole injection layer so as to enforce the dual injection of electrons and holes into the oxide layer. The image is erased by applying a potential difference of opposite polarity across the electron and hole injection layers.

9 Claims, 3 Drawing Sheets

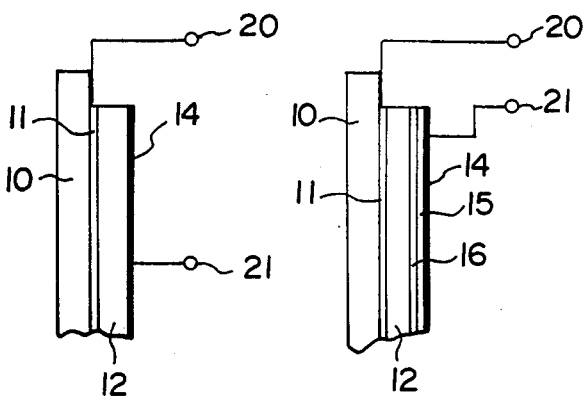
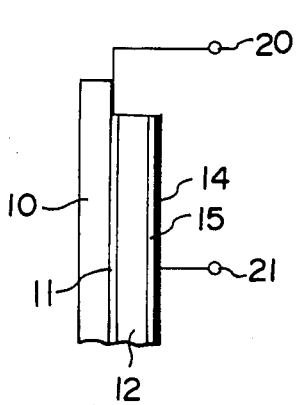
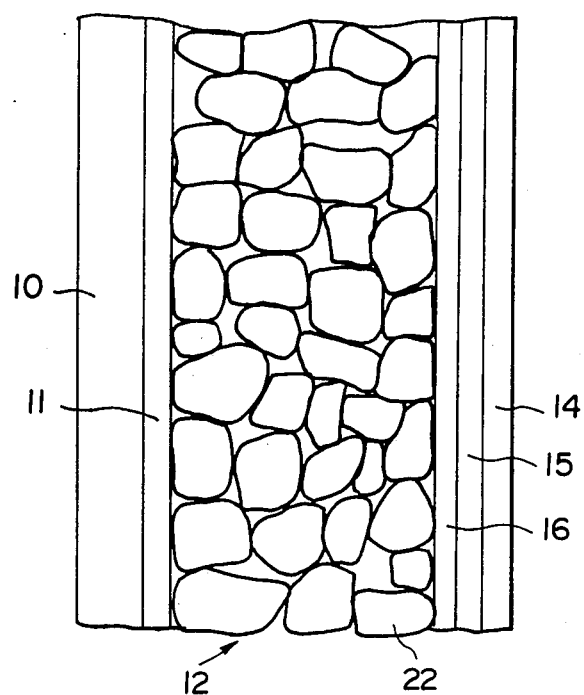

F I G. 7
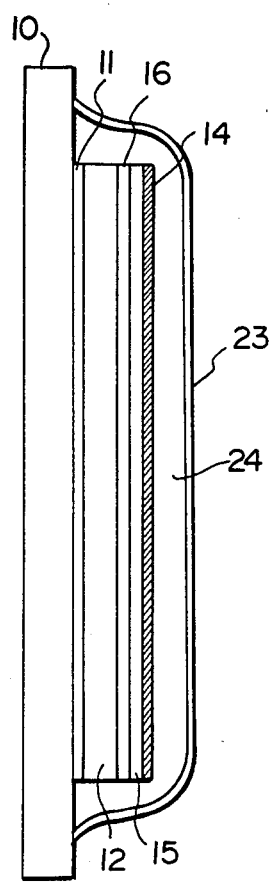
F I G. 8
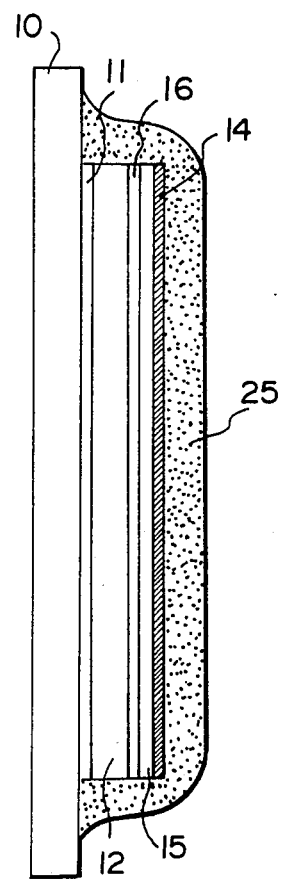

PROCESS FOR DISPLAYING INFORMATION

BACKGROUND OF THE INVENTION

1. Field of the Invention

The present invention relates to a process for displaying information, especially on a flat panel display.

2. Description of the Prior Art

The present display technology is evolving rapidly towards flat panel structures replacing the bulky and power consuming CRT in a number of applications where high resolution is not a primary concern.

This new generation of displays covers two main categories, namely the active and passive displays.

Active displays generate light on a flat surface, according to the visual pattern to be displayed. They are very much like the screen of a CRT and present the advantages and restrictions of the latter. For example, the visibility depends on the light environment and a bright light falling on the screen hampers its readability.

Passive displays reflect or absorb light selectively to form the pattern building up the image. They are similar to a printed sheet of paper: the higher the ambient light is, the better the picture. They are most suitable for operation in high ambient light conditions.

The addressing of a flat display is generally based on digital control over a crossbar conductor system where picture elements are located at orthogonal X-Y intersections. TV-type scanning is possible using shift registers for addressing the X-Y intersections row-by-row in raster fashion.

A number of flat displays have been suggested in the past decade, and the various types are distributed between the passive (light modulating) types such as:

Liquid Crystals Displays (LCD)
  Magneto Optics Displays (MOD)
  Electrochromic Displays (ECD)

and the active (light generating) types such as:

Light emitting diodes arrays (LED)
  Plasma panels (GDD)
  Electroluminescent displays (ELD)

Liquid crystal displays (LCD) are by far the most successful flat display on the market today. They are relatively economical to build, provide a fair contrast image with a resolution which is now comparable to the cathode ray tube, they can also provide a color image with somewhat lower resolution than monochrome. However, they have the drawback of providing a variable contrast with the angle of vision of the image. The addressing time is still relatively slow and they need complicated circuitry for TV scanning.

Magneto optics displays (MOD) are still very expensive to produce due to the fact that they require monocrystals which are necessarily expensive (large crystals) or need an assembly of smaller crystals in a mosaic structure. Magneto Optics Displays are also difficult to address and require higher signal voltages than the liquid crystal display.

Electrochromic displays (ECD) are the next best choice for a flat display after liquid crystals. They have the advantage over the liquid crystal display in providing an optical density based on the absorption of light rather than on scattering, which eliminates the variation of contrast with the direction of viewing. They are simpler in structure than the liquid crystal display and would probably lead to more economical manufacturing. The drawback at present is their slow response time and short life.

In the category of active displays, which present the inconvenience of restricted viewing in high light environments, the light emitting diode array (LED) is an expensive display both from the point of view of manufacturing cost and power consumption; also, the resolution is limited by the smallest size of the individual diodes. Color display is possible but with much lower resolution than the passive liquid crystal display.

Plasma panels (GDD) have proven to be competitive with the LED arrays at a much lower price. The main drawbacks are low resolution and limited lifetime.

The electroluminescent display (ELD), especially the thin film ELD, is probably the only active display which can compete with the passive liquid crystal display. This type of display has a higher resolution and is economical to manufacture. However, color display still presents a problem, as does lifetime.

SUMMARY OF THE INVENTION

An object of this invention is to provide a new passive process for the display of information which has a fast response (switching) time, which is capable of high resolution and contrast, whose contrast does not vary substantially with the angle of vision, which has the capability to provide different colors at the same addressing point, and which can operate at low signal voltage and current.

Accordingly, the invention provides a process for displaying information which comprises providing a layer of a semiconducting oxide disposed between an electron injection layer and a hole injection layer, applying a potential difference selectively across the oxide layer with the electron injection layer being negatively biased relative to the hole injection layer to create an image by the dual injection of electrons and holes into the oxide layer, the image being formed by the trapping of electrons in color center-promoting structural defects in the oxide layer, and erasing the image by applying a potential difference of opposite polarity across the electron and hole injection layers.

BRIEF DESCRIPTION OF THE DRAWINGS

Embodiments of the invention will now be described, by way of example, with reference to the accompanying drawings, in which:

FIG. 3 is a schematic cross-section of an alternative structure for the display with a single metal electron injection layer;

FIG. 4 is a schematic cross-section of the display of FIG. 1 with a tunnel electron injection layer;

FIG. 5 is a schematic cross-section of a modification of the display of FIG. 3;

FIG. 6 is a schematic cross-section of a display structure using a layer of semiconductor particles for the formation of color centers;

FIG. 7 shows a display mounted in an evacuated glass housing; and

FIG. 8 shows a display in a protective coating of water impermeable polymer.

DESCRIPTION OF THE PREFERRED EMBODIMENTS

Figure 1:
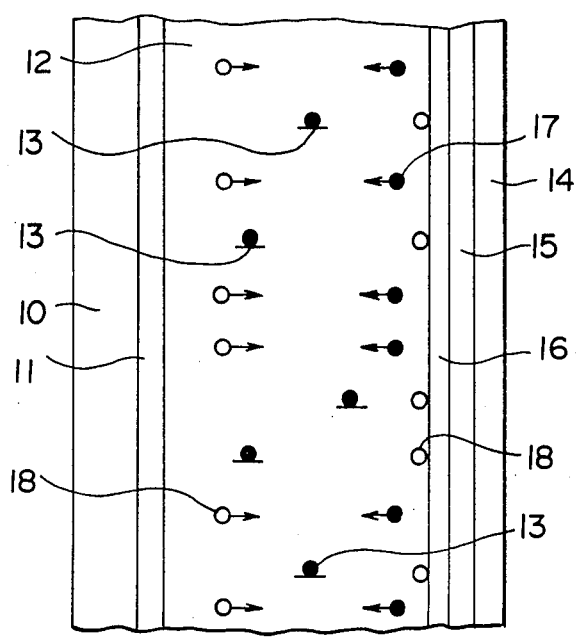
FIGS. 1 and 2 are schematic cross-sections of a display structure for the formation in a semiconducting metal oxide layer of color centers by the double injection of electrons and holes from opposite sides.

In the present invention, image formation is based on the generation and erasing of color centers in a metal oxide semiconducting layer. The basic concept differs greatly from the three other types of passive displays, i.e. liquid crystals, magneto optics and electrochromics.

Color centers are generated in solids as a result of the trapping of electrons in the vicinity of structural defects. The trapped electrons are weakly bonded to the defects and have a frequency of oscillation which corresponds to the visible or the UV part of the spectrum. In the former case they are called F.centers and in the latter V.centers. The centers absorb light at a frequency corresponding to the frequency of oscillation of the trapped electron responsible for the center and generate the complementary colour.

The condition for the creation of color centers in a solid is therefore the existence of structural defects and the promotion of electrons to be trapped in these defects. This promotion and trapping is possible if the defects correspond to certain energy levels in the band diagram of the material. The position of these levels determines the color of the center and the energy necessary to promote the electrons to such levels.

Two cases are possible:

a. The defects already exist in the material, in which case the color centers will be produced by promoting electrons to the corresponding energy level.

b. The defects have to be created and electrons must be promoted to their energy levels. This case is the most common. It includes:

A. Heating the material in presence of the vapor of one of its constituents. This is typical for alkali halides where the material is heated in presence of the vapor of the alkali metal thus allowing diffusion of the metal atoms into the lattice structure of the halide and creating Frenkel type defects. The electrons are provided by thermal excitation of the cations of the lattice.

B. Bombardment with high energy particles or radiation (X-rays, Gamma rays, Beta rays). The result is the displacement by collision of an atom of the structure from its permanent position in the lattice into an interstitial position, leaving a vacancy. The electron trapped in that vacancy is generated by ionization following the irradiation.

C. Schottky effect: A highly concentrated field due to a sharp electrode can produce a local flow of electrons with high energy resulting in the creation of color centers in a similar way as for β-rays in B above.

D. Injection structure: The electron source consists of a metal layer in a metal-insulator-metal structure similar to the "cold cathode" used in certain electronic components where the electrons leaving the negative metal are tunneled through a thin dielectric layer and are injected to the color center material through the second metal layer.

Color centers displays have been known since the 1940's where they found application in radar projection displays: [Rosenthal, A. H. Proc. IRE. 5,203 (1940)]. They consisted of a micro-crystalline layer of potassium chloride in place of the screen of a cathode ray tube. The color centers generated by an electron beam scanning the surface created an image which was projected to a larger size by suitable optical means. The erasing of the image was provided by heat and was therefore relatively slow. This is probably why this tube, called a skiatron, was never considered for television.

Early attempts to design a flat color centers display [Robillard J., C.R. NATO Conf. On Optoelectronic Signal Processing Techniques. Oslo, Norway (1969)] were made using alkali halides, as basic data on these materials were readily available at the time. The electron injection was made with an electron beam in the same way as an ordinary cathode ray tube. The erasing was still carried out by using the electrode conductive glass as a resistor.

The color center display process according to the invention uses semiconducting metal oxides singly or as a mixture to provide a range of colors [N. P. Bogoroditskii, V. Kristya and Y. A. I. Panova, Fiz. Tverd. Tela 9,253 (1967)], and provides greatly superior results both as regards cost and performance compared to these prior attempts.

Referring now to FIG. 1, a flat panel structure is shown in schematic cross-section which operates according to an embodiment of the display process according to the present invention. The structure comprises a plate 10 of NESA glass, which is a known form of glass having a thin conductive layer (not shown) on one surface, in this case the inner or right hand surface as seen in FIG. 1. A hole injection layer 11 of semiconducting material is formed on the conductive surface of the NESA glass 10, and next a semiconducting metal oxide layer 12 is provided which is heavily doped (or non-stoichiometric) to provide a high density of color center promoting structural defects 13. An electron injection layer is formed on the opposite side of the oxide layer 12 to the hole injection layer 11, the electron injection layer being a composite tunnel injection structure comprising a metal layer 14 constituting an electron emitter, a thin dielectric layer 15 constituting a tunnel layer, and a very thin metal layer 16. Typical materials, thicknesses and deposition techniques for making these various layers will be described in greater detail later.

As will be described, in operation the metal layer 14 is biased at a negative potential relative to the conductive layer on the NESA glass 10, and thus the metal layer 14 on the right of the tunnel injection structure 14 to 16 is at a negative potential with respect to the layer 16 on the left. Under these conditions electrons near the Fermi level in the metal layer 14 can "tunnel" into the conduction band of the dielectric layer 15 and reach the positive metal layer 16. This relatively positive layer 16 is thin compared with the mean free path of the electrons, and thus electrons which have tunneled through the dielectric layer 15 will cross the layer 16 and those electrons 17 having sufficient energy to overcome the work function of the metal of the layer 16 will find themselves trapped at the energy levels of the defects 13 in the color centers oxide layer 12. As electrons 17 are injected from the tunnel injection structure into the layer 12, an equal number of holes 18 have to be injected from the hole injection layer 11 in order to maintain the electronic equilibrium of the system. These holes 18 remain in the vicinity of the interface between layers 12 and 16 creating a space charge in this region.

The trapping of the electrons 17 in the defects 13 creates color centers as described. Naturally, in order to create a meaningful image, it must be possible to selectively bias the structure so that dual electron and hole injection occurs only in selected regions of the structure. To this end, to create an all points addressable display, the thin conductive layer on the NESA glass 10 is patterned in a series of parallel strips (X bars), typically several microns apart, and the metal layer 14 is likewise patterned in a series of parallel strips (Y bars) orthogonal to the strips on the glass 10. In this case, applying a potential difference across a given pair of X and Y bars (the X bar being positive relative to the Y bar) will produce a single picture element at the intersection of the two bars, and an entire image may be built up by energizing selected sets of X and Y bars as is well known in crossbar addressing.

Figure 2:
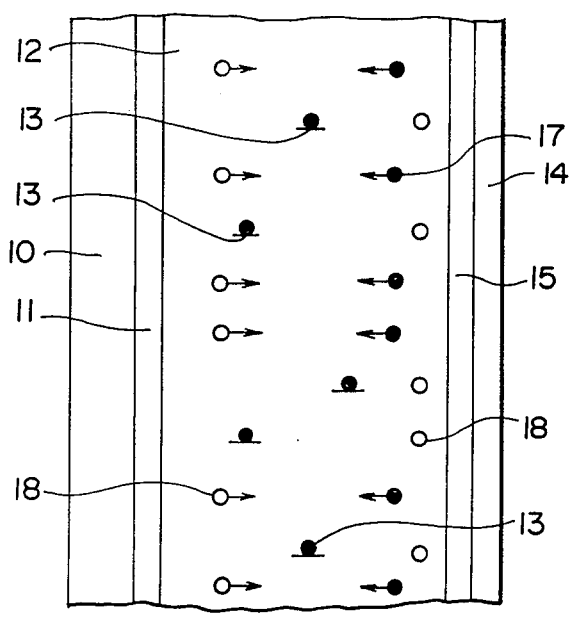

Referring to FIG. 2, a flat panel structure is shown in schematic cross-section which operates according to another embodiment of the display process according to the present invention. FIG. 2 is different from FIG. 1 in that the thin metal layer 16 is omitted. In operation, the metal layer 14 is biased at the negative potential relative to the hole injection layer 11. Under these conditions electrons 17 near the Fermi level in the metal layer 14 can "tunnel" into the conduction band of the dielectric layer 15 and reach the color center oxide layer 12 and are trapped at the energy levels of the defects 13 therein. As electrons 17 are injected into the layer 12, an equal number of holes 18 have to be injected from the hole injection layer 11 in order to maintain the electronic equilibrium of the system. Most of the holes 18 thus injected remain in the vicinity of the interface between layers 12 and the layer 15 creating a space charge in this region. This positive space charge could be sufficient to extract and accelerate the electrons tunneled through the dielectric layer 15. Thus it is not always necessary to provide the thin metal layer 16 as shown in FIG. 1, when the hole injection layer 11 is provided.

In order to bring out the semiconductor properties in the hole injection layer 11 as well as the defects necessary to the production of color centers in the semiconducting oxide layer 12, it is necessary to "dope" these materials. The doping material and procedure will vary somewhat with the material concerned as will be understood by those skilled in the art, being determined by the energy band structure and other solid state properties. Two general methods can be used depending upon whether the layer 11 or 12 is: (a) an evaporated thin film of the semiconductor material, or (b) semiconductor particles dispersed in a binder and forming a coated layer.

In the former case (a) the doping can take place through the evaporation of an extremely thin film of the dopant on top of the semiconductor layer after formation of the latter and increasing the temperature of such layer to provide the diffusion of the dopant into the semiconductor layer. In the latter case (b) the semiconductor material is introduced in an aqueous solution of a salt of the dopant e.g. copper sulfide. It is agitated for several hours and then filtered and dried. The dry particles which have absorbed some of dopant salts on their surface are then heated in a vacuum oven at a temperature allowing the diffusion of the dopant into the bulk of the particles for several hours. The temperature will vary with the material to be doped and the dopant according to the diffusion characteristics of the dopant into the semiconductor. Table I lists a number of semiconductor materials together with appropriate dopants which may be used for the preparation of hole injection layers 11 and the temperature of diffusion. Table II shows a number of semiconducting metal oxide materials with the appropriate dopants and diffusion temperatures which may be used for the preparation of color-center-forming layers 12.

As mentioned above, the display operates as follows: when a DC potential difference is applied between a particular X bar and a Y bar, the latter being relatively negative, electrons and holes are injected at the point of intersection XY into the portion of layer 12 located at the intersection thereby creating color centers in this portion which appears as a color point on the display. If now a reverse potential difference is applied between the same bars with the necessary amplitude to create a field sufficient to extract the trapped electron from its weak bond, the color center is then destroyed and the point on the display is erased. The erasing potential difference will generally require a higher amplitude to generate the field necessary to extract the trapped electrons from their sites.

The density of any point of the image will be proportional to the density of defects in the material and the number of electrons injected to that particular point. Grey scale will then be possible by current modulation.

It is to be understood that where an alphanumeric character display is required, instead of forming X and Y bars one of the conductive layers across which the biasing is applied can be in the form of character segments in known fashion, for example as in liquid crystal calculator displays, with the other conductive layer applied continuously without striping or segmentation.

Electrons can also be injected into the color center-forming layer 12 by a single electron injection layer rather than a composite tunnel injection structure, in which case layers 15 and 16 are omitted. This is shown in FIG. 3 where the same reference numerals have been used as in FIG. 1 for the same layers. This alternative, the use of a single metal layer as the electron injection layer, is only applicable for a display structure operating for example in vacuum or encapsulated in a water impermeable material such as a polymer as will be described with reference to FIGS. 7 and 8.

FIG. 4 corresponds to the structure of FIG. 1, and is illustrated to show the electrical connections 20 and 21 to the NESA glass 10 and layer 14 respectively which permit the aforementioned biasing to be applied (the connections are also shown in FIG. 2), although it is to be understood that such connections are only shown schematically since multiple connections to at least one side of the structure will of course be necessary for selective biasing.

FIGS. 3 and 4 also show that the glass layer 10 provides a relatively thick supporting substrate upon which the other layers are successively deposited. However, although in the structures so far described the glass substrate is disposed adjacent the hole injection layer, it is possible to build the structure up from the opposite side with the glass substrate 10 adjacent the electron injection layer whether this be a single metal layer or a composite tunnel structure. This is illustrated in some of the specific examples to be described later.

FIG. 5 corresponds to a structure of the display using tunnel injection as in FIG. 4 but where the layer 16 has been omitted, the tunneling electrons using the concentration of holes at the interface with the dielectric layer 15 as an accelerating potential as previously described.

FIG. 6 is a structure similar to FIG. 1 using a dispersion of semiconducting metal oxide particles in a binder as the color-center-forming layer 12. In other respects the structure of FIG. 5 corresponds to that of FIG. 1.

FIG. 7 shows the display structure of FIGS. 1 and 4 mounted in an evacuated housing where 23 represents the glass wall of the evacuated housing and 24 the free evacuated space in that housing, and FIG. 8 represents the display structure of FIGS. 1 and 4 encapsulated in a polymer 25 which is non permeable to air and water. In both cases the glass plate 10 forms the substrate on which the entire structure is supported, including the housing 23 or polymer 25. In both FIGS. 7 and 8 the other reference numerals correspond to those used in FIGS. 1 and 4. As mentioned previously, these forms of protection are particularly suitable for the structure of FIG. 3.

The display can operate with two alternative forms of electron injection layer: a single metal injection layer corresponding to FIG. 3 or a composite tunnel injection structure corresponding to FIGS. 1, 2 and 4. The advantage of using a tunnel injection structure is mainly to prevent unwanted ionic currents that could develop in the structure due to water absorption (humidity) in the multistructure layer. It also provides a limiting action on the current. The tunnel injection layer alternative is not necessary when the display structure is protected by a vacuum evacuated glass housing or a non-water permeable polymer in the manner represented in FIGS. 7 and 8.

In the first and second alternatives the hole injection layer 11 can be obtained by vacuum evaporation onto the glass plate 10 of one of the following compounds: lead sulfide PbS, lead telluride PbTe, lead selenide PbSe, cadmium telluride CdTe, tin telluride SnTe, Vanadium oxide $V_2O_5$, tantalum oxide $Ta_2O_5$, chromium oxide $Cr_2O_3$, beryllium oxide $Be_2O_3$, indium oxide $InO_2$, lead-tin selenide PbSnSe, lead-tin telluride PbSnTe or other material from Table I, to a thickness of from 0.2 to 1 micron. The evaporation is made in a vacuum chamber at $10^{-6}$ mm Hg using conventional techniques, and is followed by the deposition and diffusion of a suitable dopant as previously described.

In the first and second alternative the color center-forming layer 12 can be obtained either by evaporation of the semiconducting metal oxide onto the hole injection layer 11 or by forming a layer made of a dispersion of the semiconducting metal oxide in an appropriate binder onto the hole injection layer. In both cases the material used as semiconducting metal oxide can be chosen among the following categories: tin oxide, titanium oxide, zinc oxide, zirconium oxide, or any of the rare earth materials such as cerium oxide or lanthanum oxide.

In the first case the oxide can be evaporated in vacuum under the pressure of $10^{-6}$ mm Hg using a tantalum, molybdenum or tungsten boat up to a thickness of from 0.2 to 1 microns, followed by deposition and diffusion of a suitable dopant as indicated in Table II.

In the second case the oxide, in the form of doped particles with a size of from 0.1 to 10 microns, is dispersed in a binder solution with an oxide to binder ratio varying from 3:1 to 5:1 parts by weight and coated on the hole injection layer using standard coating methods. The final thickness of the coated layer after solvent evaporation is from 1 to 10 microns. The binder can be a butadiene polymer, a styrene polymer or a butadiene-styrene co-polymer. The hole injection layer 11 can also be made in this manner, the sole difference being that the doped particles used are selected from Table I.

In the first alternative, the single metal injection layer 14 may be a thin metal film obtained by vacuum evaporation at a pressure of $10^{-6}$ mm Hg directly on the color center-forming layer 12. This film can be a low work function metal such as Antimony, Bismuth, Zirconium, Silver, Gold, Copper, Tungsten, Molybdenum, Nickel, Aluminium, Silicon or Tantalum with a thickness of from 0.5 to 5 microns. In the case of a crossbar structure the metal will be evaporated through a mask forming parallel stripes oriented perpendicularly to the corresponding conductive stripes of the glass substrate 10. In the case of an alphanumeric display the mask will form basic segments corresponding to the building elements of the characters and the glass substrate 10 would carry a continuous unstriped conductive layer.

In the second alternative (the tunnel injection structure), the layer 16 (if the layer 16 is provided) may be an extremely thin film of metal obtained by vacuum evaporation at a pressure of $10^{-6}$ mm Hg and made of one of the following metals: Gold, Silver, Chromium, Aluminium, Tantalum, Molybdenum, Nickel or Tungsten, with a thickness of from 10 to 50 angstroms. The dielectric layer 15 may be a thin dielectric layer obtained by vacuum evaporation or vacuum sputtering of an oxide chosen from the group of materials including Antimony oxide, Bismuth oxide, Silicon dioxide and Zirconium oxide with a thickness of from 50 to 100 angstroms. Finally, the layer 14 which is the electron emitting layer may be a thin film of metal obtained by vacuum evaporation at a pressure of $10^{-6}$ mm Hg and made of one of the following metals: Aluminium, Antimony, Bismuth, Zirconium, Silicon, Silver, Gold, Copper, Tungsten, Molybdenum or Tantalum with a thickness of from 0.2 to 1 microns.

In the case of crossbar addressing this metal layer 14 will be obtained by vacuum evaporation through a mask forming parallel stripes oriented perpendicularly to the corresponding stripes on the conductive glass substrate 10. In the case of alphanumeric display the mask will form the segments building up the characters.

The thickness of the layer 16 is smaller than the mean free path of electrons tunneled through the dielectric layer 15, and may be omitted as mentioned above so that the dielectric layer 15 is in direct contact with the semiconducting oxide layer 12.

As mentioned earlier, the display structure may be built up on the glass substrate in the opposite order from that described. Thus the electron injection layer whether it be a single metal layer or a composite structure may be deposited first on the glass plate, which in this case could be non-conductive, followed by the semiconducting metal oxide layer 12 and the hole injection layer 11. This would permit the dielectric layer 15 to be a thermally or electrochemically grown oxide of the layer 14.

Specific examples of structures which operate according to the invention will now be described. In all cases it is assumed that the semiconductor materials are doped as described earlier. It will be recognized that Examples I to III and VI to VIII use a single metal layer for electron injection whereas the remaining Examples IV, V, IX and X use a tunnel injection structure. Also, in these latter examples the layered display structure is built up on the glass substrate from the electron injection side to the hole injection side, i.e. in the opposite direction to the previously described Figures.

EXAMPLE I

On a conductive NESA glass, a layer of lead sulfide PbS having a thickness of 0.5 microns is evaporated in a vacuum at a pressure of $10^{-6}$ mm Hg. A second layer of tin oxide is then evaporated on top of the preceding layer, the new layer having a thickness of 1 micron. A third layer made of a vacuum evaporated film of gold having a thickness of 0.2 microns is formed through a suitable mask providing segments of alpha numeric characters. The application of a voltage of 5 Volts between each gold segment and conductive glass plate provides a blue color in the region corresponding to the segment on which the voltage is applied. The application of a reverse voltage of 5 Volts causes the obliteration of the information.

EXAMPLE II

On a conductive substrate made of NESA glass a layer of lead selenide PbSe is evaporated under vacuum to a thickness of 0.5 microns.

An emulsion containing 5 grams of cerium oxide dispersed in a solution of 1 gram of Vylit (a styrene butadiene made by Shell) in 24 grams of Toluene is prepared by ball milling the components for 24 hours. This emulsion is then coated on the previously deposited lead selenide layer with a coating thickness of 2 microns.

A third layer made of evaporated zirconium is then formed on top of the coated layer, this evaporated layer having a thickness of 0.5 microns. The evaporation on this last layer is carried out through a mask forming segments of alpha numeric characters. The application of a voltage of 8 Volts between each segment and the conductive glass substrate provides a red-brown coloration of the area corresponding to the segments on which the voltage is applied. The application of a reverse voltage of 10 Volts causes the erasing of the colored area on the display.

EXAMPLE III

An emulsion with the following composition is prepared: $Ta_2O_5$ 5 grams; Pliolite (styrene butadiene resin made by Goodyear) 1 gram; Toluene 15 grams. This composition is ball milled for 24 hours and coated in the thickness of 0.8 microns on a conductive glass (NESA). After drying of the previous coating a layer of $SnO_2$ is evaporated under vacuum to a thickness of 0.8 microns. A third layer made of nickel is then evaporated on top of the $SnO_2$ layer, this last layer having a thickness of 0.5 microns and the evaporation being conducted through a mask forming segments of alpha numeric characters. The application of a voltage of 6 Volts between individual segments and the conductive glass plate provides a green-blue coloration in the areas corresponding to the segments on which the voltage is applied. The application of a reverse voltage of 8 Volts causes the disappearance of the coloration.

EXAMPLE IV

A layer of Antimony having a thickness of 0.2 microns is vacuum evaporated on a conductive glass. The plate is then removed from the vacuum system and introduced into a furnace where it is brought to a temperature of 400° C. for a period of 20 minutes to form a dielectric layer. The plate is then reintroduced in the vacuum system where an extremely thin layer of gold having a thickness of 50 angstroms is evaporated. This is followed by the evaporation of a third layer of doped tin oxide to a thickness of 1 micron. A fourth layer made of cadmium telluride CdTe is subsequently evaporated to a thickness of 0.2 microns, and gold is evaporated on the fourth layer through a mask forming segments of alpha numeric characters. The application of a voltage of 8 Volts between the conductive glass plate and each segment provides a dark blue coloration of the area corresponding to the segments. The application of a reverse voltage of 12 Volts causes the obliteration of the information.

EXAMPLE V

A layer of bismuth with a thickness of 0.8 microns is evaporated on a conductive glass plate. The plate is then removed from the vacuum system and introduced into a furnace where it is brought to a temperature of 300° C. for 30 minutes to form a dielectric layer. The plate is then reintroduced in the vacuum system where a new layer, of lanthanum oxide is evaporated to a thickness of 0.8 microns. An emulsion is then prepared by ball milling for 24 hours a composition containing 21 grams of zinc oxide, 7 grams of polystyrene dissolved in 40 grams of benzene and coating the emulsion on top of the last evaporated layer to a thickness of 2 microns. The structure is completed by evaporating through a mask forming segments of alpha numerics, a metal such as nickel or aluminium. Upon application of a voltage of 8 Volts between each metallic segment and the conductive glass plate a dark red coloration is formed in the area corresponding to the segments. The application of a reverse voltage of 11 Volts erases the colored, area.

EXAMPLE VI

Same as Example I except that the conductive layer of the NESA glass is patterned in the form of parallel strips 10 microns wide and 10 microns apart by a masking procedure and the third layer of the structure is patterned similarly but the strips are oriented perpendicularly to the direction of the strips on the glass.

EXAMPLE VII

Same as Example II except that the conductive layer of the NESA glass is patterned in the form of parallel strips as above and the third layer of the structure is patterned similarly but the strips are oriented perpendicularly to the direction of the strips on the glass.

EXAMPLE VIII

Same as Example III except that the conductive layer of the NESA glass is patterned in the form of parallel strips as above and the third layer of the structure is patterned similarly but the strips are oriented perpendicularly to the direction of the strips on conductive glass.

EXAMPLE IX

Same composition as Example IV with the Antimony and gold layers formed into character segments and the cadmium telluride CdTe layer is non-segmented.

EXAMPLE X

Same composition as Example V with the bismuth layer being formed into character segments and the metal layer is non-segmented.

TABLE I

| Semiconductor | Dopant | Diffusion Temperature °C. |
|---|---|---|
| $ZnO_2$ | Ni | 350 |
| PbS | Cu | 700 |
| PbTe | Sn | 400 |

TABLE I-continued

| Semiconductor | Dopant | Diffusion Temperature °C. |
| --- | --- | --- |
| PbSe | Sb | 400 |
| CdTe | Sb,Li | 400/120 |
| SnTe | Sb | 420 |
| $V_2O_5$ | V | — |
| $Al_2O_3$ | Y,Co | 850 |
| $Cr_2O_3$ | Ho,Mg | 800/550 |
| BeO | Ag | 750 |
| $InO_2$ | Gd,Sn | 800 |
| PbSnSe | Cu | 750 |
| PbSnTe | Cu | 750 |
| $Ta_2O_5$ | $O_2$ | 850 |
| $SnO_2$ | $O_2$ | 810 |
| ZnS | Sb,Li | 400/120 |
| CdS | Sb,Li | 400/120 |

TABLE II

| Semiconductor | Dopant | Diffusion Temperature °C. |
| --- | --- | --- |
| $SnO_2$ | Ni,La | 850 |
| $TiO_2$ | Ti,La | 700 |
| $ZnO_2$ | Li,Gd | 120/550 |
| $ZrO_2$ | Gd,Sn | 800 |
| $CeO_2$ | Cu | 700 |
| $LaO_2$ | La | 700 |

I claim:

1. A process for displaying information which comprises providing a layer of a semiconducting oxide disposed between an electron injection layer and a hole injection layer of a semiconducting material, applying a potential difference selectively across the oxide layer in accordance with an image to be formed with the electron injection layer being negatively biased relative to the hole injection layer to create an image by the dual injection of electrons and holes into the oxide layer, the image being formed by the trapping of electrons in color center promoting structural defects in the oxide layer, and erasing the image by applying a potential difference of opposite polarity across the electron and hole injection layers.

2. The process according to claim 1 where the electron injection layer is a compound structure comprising a metal electron emitting layer and a dielectric layer directly in contact with the semiconductor oxide layer for injecting electrons into said oxide layer to cause the formation of color centers.

3. The process according to claim 1 where the electron injection layer is a compound structure comprising a metal electron emitting layer, a dielectric layer, and a further metal layer, whose thickness is smaller than the mean free path of the electrons tunneled through the dielectric layer, directly in contact with the semiconductor oxide layer.

4. The process according to claim 1 where the electron injection layer essentially consists of a single metal electron emitting layer.

5. The process according to any one of claims 1 to 4 where the electron injection layer comprises Antimony, Bismuth, Zirconium, Silver, Gold, Copper, Tungsten, Molybdenum, Nickel, Aluminium, Silicon or Tantalum.

6. The process according to any one of claims 1 to 4 where the hole injection layer comprises a vacuum evaporated film of lead sulfide PbS, lead telluride PbTe, lead selenide PbSe, cadmium telluride CdTe, tin telluride SnTe, vanadium oxide $V_2O_5$, tantalum oxide $Ta_2O_5$, chromium oxide $Cr_2O_3$, beryllium oxide $Be_2O_3$, indium oxide $InO_2$, lead-tin selenide PbSnSe or lead-tin telluride PbSnTe.

7. The process according to any one of claims 1 to 4 where the hole injection layer comprises semiconductor particles in a binder with a particles to binder ratio from 3:1 to 5:1 parts by weight, the material of the particles comprising zinc oxide $ZnO_2$, aluminium oxide $Al_2O_3$, tantalum oxide $Ta_2O_5$, zinc sulfide ZnS or cadmium sulfide CdS, and the binder comprising a butadiene polymer, styrene polymer or styrene butadiene co-polymer.

8. The process according to claim 1 where the semiconducting oxide layer comprises a vacuum evaporated film of zinc oxide, tin oxide, titanium oxide, zirconium oxide, cerium oxide or lanthanum oxide.

9. The process according to any one of claims 1 to 4 where the semiconducting oxide layer is made of oxide particles in a binder with an oxide to binder ratio from 3:1 to 5:1 parts by weight, the oxide comprising zinc oxide, tin oxide, titanium oxide, zirconium oxide, cerium oxide or lanthanum oxide, and the binder comprising a butadiene polymer, styrene polymer or styrene-butadiene co-polymer.

* * * * *